June 9, 1942.   J. E. SLEETH   2,286,118
PIPE HANGER
Filed March 24, 1941

John E. Sleeth   Inventor

By Glenn L. Fish   Attorney

Patented June 9, 1942

2,286,118

UNITED STATES PATENT OFFICE 2,286,118

PIPE HANGER

John E. Sleeth, Spokane, Wash.

Application March 24, 1941, Serial No. 384,814

2 Claims. (Cl. 248—58)

This invention relates to pipe hangers and it is one object of the invention to provide a hanger by means of which furnace pipes, air ducts, and similar conduits may be suspended from an overhead support such as a floor joist or the like.

Another object of the invention is to provide a hanger consisting of a clip or bracket having its upper portion adapted to be secured against a floor joist by a nail and its lower portion so formed that it may be firmly engaged with a pipe to be supported and the pipe suspended from the joist.

Another object of the invention is to provide the clip or bracket with a hook at its lower end for engagement with a seam or joint of the pipe, the clip being also provided with a tongue adapted to be bent downwardly into engagement with the pipe to hold the hook in engagement with the pipe joint or seam and thus prevent the pipe from slipping out of engagement with the clip which suspends it from the overhead support.

Another object of the invention is to provide a pipe hanger which is formed of sheet metal and may be manufactured at low cost.

Figure 1:
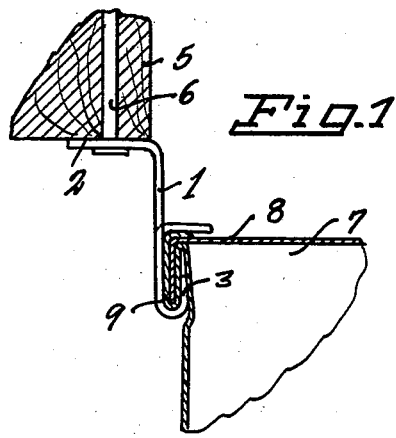
Fig. 1 is a view showing the improved pipe hanger in side elevation, portions of a pipe and floor joist being shown in section.

This improved pipe hanger is formed of stiff sheet metal and the blank from which it is formed is of such length that it may be bent to form an elongated body 1 having a laterally extending lip 2 at its upper end and an upturned hook or bill 3 at its lower end. An opening 4 is formed through the lip 2, centrally thereof, so that when the pipe hanger or bracket is in use, it may be secured against the under face of a floor joist 5, or other overhead support, by a nail 6 which is driven through the opening into the joist to hold the lip firmly against the joist.

Figure 2:
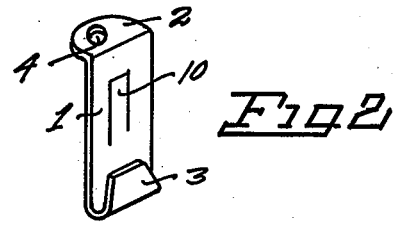
Fig. 2 is a perspective view of the pipe hanger.
Figure 3:
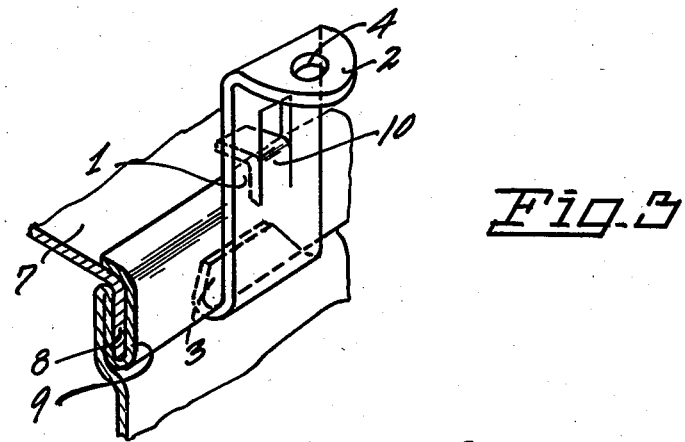
Fig. 3 is a perspective view showing the improved pipe hanger applied to a portion of a pipe.

The pipe or conduit 7 is formed of sheet metal and may be a stove pipe for a heating plant, or a conduit of a ventilating system, this pipe having a folded joint 8 along one side, the U-shaped fold 9 of the joint being disposed outwardly of the pipe so that by prying a portion of this fold outwardly with a screw driver or other convenient tool, the bill or hook 3 of the hanger may be engaged with the joint, as shown in Figs. 1 and 3. When the hook is so engaged with the seam or joint 8, the pipe or conduit will be suspended from the overhead support 5 by the hanger and its weight borne by the hook. An intermediate portion of the body 1 of the hanger is cut to form a tongue 10 which has its upper end free and is attached at its lower end. After the hook has been engaged with the seam of the pipe, the tongue is bent downwardly so that it overhangs the pipe and rests on the upper wall thereof in overlapping engagement with the seam. Therefore, the tongue will serve very effectively to hold the hook in supporting engagement with the seam and the pipe will be prevented from slipping out of engagement with the hanger. When it is desired to detach the hanger from the pipe, it is merely necessary to bend the tongue upwardly to approximately its initial position, and the hook may then be slipped downwardly out of engagement with the seam. The hook has its bill tapered upwardly, as shown in Figs. 2 and 3, in order that it may be easily forced upwardly into place when applying the hanger to a pipe.

Figure 4:
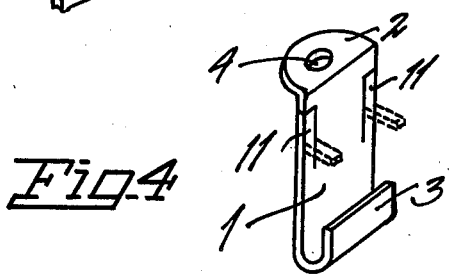
Fig. 4 is a perspective view of a modified form of pipe hanger.

If desired, the bill of the hook may be the full width thereof, as shown in Fig. 4. Referring to this figure, it will be seen that instead of providing a single tongue centrally of the body of the hanger, there may be provided two tongues 11 which extend along opposite side edges of the hanger and, when bent downwardly, are spaced from each other transversely of the hanger.

Having thus described the invention, what is claimed is:

1. A pipe hanger comprising a strip of stiff sheet metal having one end portion bent to form a laterally extending lip adapted to be secured against an overhead support, the other end portion of the strip being bent to form an upturned hook for engagement with a folded seam of a pipe, and a tongue struck from the strip and extending longitudinally thereof with its upper end free whereby the tongue may be bent downwardly into overlying engagement with a pipe to hold the hook in supporting engagement with the seam of the pipe.

2. A pipe hanger comprising a strip of stiff sheet metal having one end portion bent to form a laterally extending lip adapted to be secured against an overhead support, the other end portion of the strip being bent to form an upturned hook for engagement with a folded seam of a pipe, and tongues cut from the strip and extending longitudinally thereof along opposite side edges thereof, the tongues being free at their upper ends and adapted to be bent downwardly and extending laterally from the bracket in spaced relation to each other transversely thereof for overlapping engagement with the upper portion of a pipe to hold the hook in supporting engagement with the seam of the pipe.

JOHN E. SLEETH.